United States Patent [19]
Hasegawa

[11] 3,959,718
[45] May 25, 1976

[54] DIRECT CURRENT SUPPLY SOURCE

[75] Inventor: Kiyoshi Hasegawa, Tokyo, Japan

[73] Assignee: Oki Electric Industry Company, Ltd., Tokyo, Japan

[22] Filed: June 3, 1974

[21] Appl. No.: 475,982

[30] Foreign Application Priority Data
June 15, 1973, Japan.................................. 48-66942

[52] U.S. Cl. ................................................. 323/48
[51] Int. Cl.² ....................................... G05F 7/00
[58] Field of Search ............... 179/170 J, 175, 31 R; 323/48

[56] References Cited
UNITED STATES PATENTS

| | | |
|---|---|---|
| 3,059,121 | 10/1962 | Masters et al................ 179/170 J X |
| 3,119,063 | 1/1964 | Brightman et al. ..... 179/175.31 R X |
| 3,384,810 | 5/1968 | Kelsey.................................... 323/48 |
| 3,714,548 | 1/1973 | Macrander............................ 323/48 |

*Primary Examiner*—William M. Shoop
*Attorney, Agent, or Firm*—Kenyon & Kenyon

[57] ABSTRACT

A direct current supply circuit for supplying a direct current to a communication terminal device as well as for repeating information from said communication terminal device to an electronic exchange has been disclosed. Said direct current supply circuit comprises a transformer, which has four primary windings. By arranging the direction of the direct current in said primary windings, saturation of magnetic flux in said transformer can be prevented and thus, the size of the transformer can be reduced.

1 Claim, 2 Drawing Figures

DIRECT CURRENT SUPPLY SOURCE

BACKGROUND OF THE INVENTION

The present invention relates to a DC current source for supplying DC current to a communication terminal device.

For communicating over the telephone, carrier communication system, etc., it has been heretofore necessary to supply DC current to the communication terminal device. In case such a communication terminal device comprises the electronics, however, the supplied DC current was very disadvantageous to the switching and demodulation operations.

According to a prior art for supplying a direct current to a communication terminal device, such as a telephone terminal, a transformer has been utilized between the telephone terminal and an electronic exchange for preventing the direct current from flowing through the electronic device.

In the DC current supply circuit using such a transformer, it was necessary to provide a larger core of the transformer in order to prevent magnetic saturation due to the DC current flowing through the primary subwindings and the transformer, which would restrict such a ransformer device from being manufactured in a smaller size.

SUMMARY OF THE INVENTION

It is an object, therefore, of the present invention to overcome the disadvantage of the prior art by providing a new and improved DC current source.

It is also an object of this invention to provide a new and improved method for supplying a DC current to a terminal equipment.

The above and other objects are attained by a DC current source using a smaller transformer wherein the primary winding is composed of 4 sub-divided primary windings to cancel the magnetic flux caused by the supplied DC current so that magnetic saturation of the transformer core is prevented.

BRIEF DESCRIPTION OF THE DRAWINGS

The foregoing and other objects, features, and attendant advantages of the invention will be appreciated as they become better understood by the accompanying drawings wherein.

DETAILED DESCRIPTION OF THE PREFERRED EMBODIMENT

Figure 1:
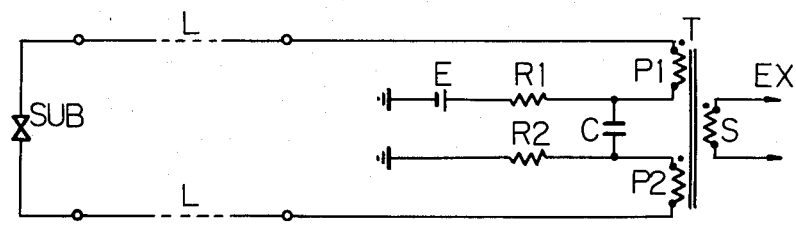
FIG. 1 illustrates schematically, by way of example, the conventional DC current supply circuit.

FIG. 1 illustrates schematically, by way of example, the conventional DC current supply circuit section of a subscriber circuit included in a full electronic exchange. In this diagram, the subscriber transformer is designated by T, the transformer's first primary sub-winding by P1, the second primary sub-winding by P2 and the secondary winding is designated by S. Said primary winding has a subscriber SUB connected thereto between the beginning of the first primary winding P1 and the end of the second primary winding P2 through transmission lines L, the end of the first primary winding P1 and the beginning of the second primary winding P2 being connected together through a capacitor C and said capacitor C is connected at both the ends to a voltage source E for supplying the DC current and resistors R1 and R2. Further, the secondary winding S S of said transformer T is connected to the input of an electronic switching circuitry.

When the DC current supply using such a transformer T is operated, the DC current is supplied from the voltage source E through the resistance $R_1$, first primary winding $P_1$, one transmission line L, subscriber SUB, another transmission line L, second primary winding $P_2$ and the resistance $R_2$ to the earth, while the voice current (alternate current) superposed on said DC current flows from the subscriber SUB through the first transmission line L, first primary winding $P_1$, capacitor C, second primary winding $P_2$ and the second transmission line L to the subscriber SUB. Now in the transformer, only said voice current (AC current) is induced in the secondary winding S through which will not flow said DC current supplied to the subscriber circuit SUB. Accordingly, the DC current does not flow in an electronic exchange such as a space-division switching circuitry consisting of a PNPN diode or in a switching circuitry using a time-division gate comprising a transistor, a diode and the like.

However, the current source in FIG. 1 has the disadvantage previously explained.

Figure 2:
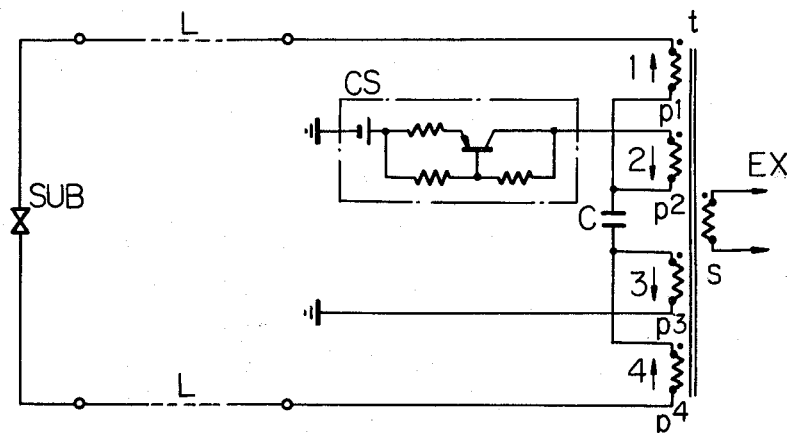
FIG. 2 shows one embodiment of the DC current supply circuit in accordance with the present inventin.

FIG. 2 shows one embodiment of the DC current source according to th present invention.

In FIG. 2 it is seen that the subscriber transformer is shown at t, the current source at CS, the subscriber at SUB, the capacitor at C and the transmission lines at L. In the subscriber transformer $t$, the secondary side is comprised of a single secondary winding s as in the conventional transformer while the primary winding is formed by 4 subdivided primary windings $p1$ to $p4$ with the same number of turns. The subscriber SUB is connected between the beginning of the first primary winding $p1$ and the end of the fourth primary winding $p4$ by means of a transmission line L, and a capacitor C is connected between the connection point of the first primary winding $p1$ to the end of second primary winding $p4$ and the connection point of the beginnings of the third and fourth windings $p3$ and $p4$. Furhter, the source CS of the DC current to the subscriber SUB is connected to the beginning of the second primary winding $p2$ and the end of third primary winding $p3$.

The DC current from the source CS flows through the second primary winding $p2$, first primary winding $p1$, a transmission line L, subscriber circuit SUB, another transmission line L, fourth primary winding $p4$ and the third primary winding $p3$ to the earth, in this order. Consequently, in the subscriber transformer $t$, the supplied DC current will cause magnetic fields of the directions indicated by the arrows marked 1, 2, 3 and 4, respectively in the primary windings $p1$, $p2$, $p3$, $p4$, respectively. Those magnetic fields will act in the direction to cancel each other so that the magnetic field due to the DC current disappears in the subscriber transformer $t$, resulting in elimination of the magnetic saturation of the transformer core.

Further, the voice current superposed on said DC current by the subscriber circuit SUB flows from the circuit SUB through the first transmission line L, first primary winding $p1$, capacitor C, fourth primary winding $p4$, another transmission line L to the subscriber circuit SUB, resulting in the induction of AC current in the secondary winding s corresponding to the voice current. Although the AC current corresponding to the voice current may be induced also in the loop from the current source CS through the second primary winding $p_2$, capacitor and the third primary winding $p_3$ to the earth, the induced AC current may be low enough to be neglected since the current CS has a very high internal impedance.

In the embodiment of the present invention shown in FIG. 2, a self-bias type base-grounded circuit using a transistor $T_r$, resistors $r_1$, $r_2$ and $r_3$ is disclosed as a current source, however, it will be understood that such a DC current supply circuit may be easily embodied using a constant-current diode.

As has been described in detail the DC current supply circuit in accordance with the present invention supplies the DC current to the communication terminal device without the possibility of magnetic saturation in a transformer core of small size.

From the foregoing, it will now be apparent that a new and improved DC current source has been found. It should be understood, of course, that the embodiment disclosed is merely illustrative and is not intended to limit the scope of this invention. Reference should be made to the appended claims, therefore, rather than the specification for indicating the scope of the invention.

Finally, the major symbols in this specification and drawings are listed below.

| | |
|---|---|
| L, | transmission line |
| SUB, | communication terminal device |
| T, t, | transformer |
| $R_1$, $R_2$, $r_1$, $r_2$, $r_3$, | resistor |
| $P_1$, $p_1$, | first primary winding |
| $P_2$, $p_2$, | second primary winding |
| $p_3$, | third primary winding |
| $p_4$, | fourth primary winding |
| S, s, | secondary winding |
| C, | capacitor |
| EX, | electronic exchange |
| CS, | current source |

1. A method for supplying a direct current from a current source through a transformer having four primary windings and a transmission line to a communication terminal device comprising the steps of;
   a. flowing a direct current in a circuit from one end of the current source through the beginning of a second primary winding, the end of the second primary winding, the end of the first primary winding, the beginning of the first primary winding, the transmission line, the communication terminal device, the transmission line, the end of the fourth primary winding, the beginning of the fourth primary winding, the beginning of the third primary winding, and the end of the third winding, to the other end of the current source,
   b. transmitting an alternate current from the communication terminal device through the transmission line, first and fourth primary windings connected by a capacitor to each other, and a secondary winding of said transformer, to an electronic exchange.

* * * * *

UNITED STATES PATENT AND TRADEMARK OFFICE
CERTIFICATE OF CORRECTION

PATENT NO. : 3,959,718
DATED : May 25, 1976
INVENTOR(S) : Kiyoshi Hasegawa

It is certified that error appears in the above-identified patent and that said Letters Patent are hereby corrected as shown below:

Col. 2, line 3, delete "S" second occurrence.

Col. 2, line 27, correct spelling of "the".

Claim 1

Col. 4, line 24, after "third" and before "winding" insert --primary--.

Signed and Sealed this

Twenty-fourth Day of August 1976

[SEAL]

Attest:

RUTH C. MASON
Attesting Officer

C. MARSHALL DANN
Commissioner of Patents and Trademarks